July 29, 1924.
B. SOOTS ET AL
1,503,139
SAFETY REVERSE RATCHET BRAKE
Filed Nov. 22, 1923    3 Sheets-Sheet 1
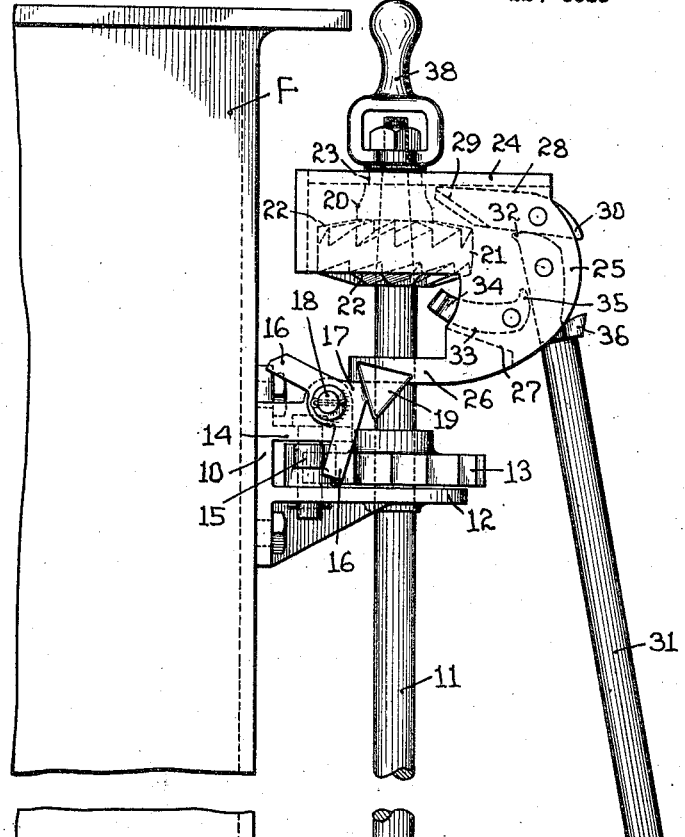
*Fig. 1.*
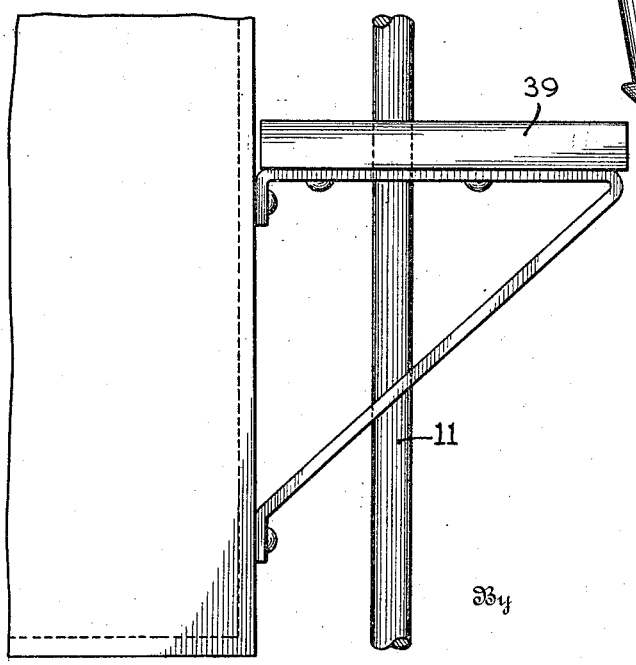
Inventors
BURL SOOTS
JOHN KLANCHER
H.A. MAGRATH
GEORGE VAN BRIMER
By Eugene E. Brown
Attorney July 29, 1924.

B. SOOTS ET AL 1,503,139

SAFETY REVERSE RATCHET BRAKE

Filed Nov. 22, 1923   3 Sheets-Sheet 2

Inventors,
BURL SOOTS
JOHN KLANCHER
H. A. MAGRATH
GEORGE VAN BRIMER

By

Attorney

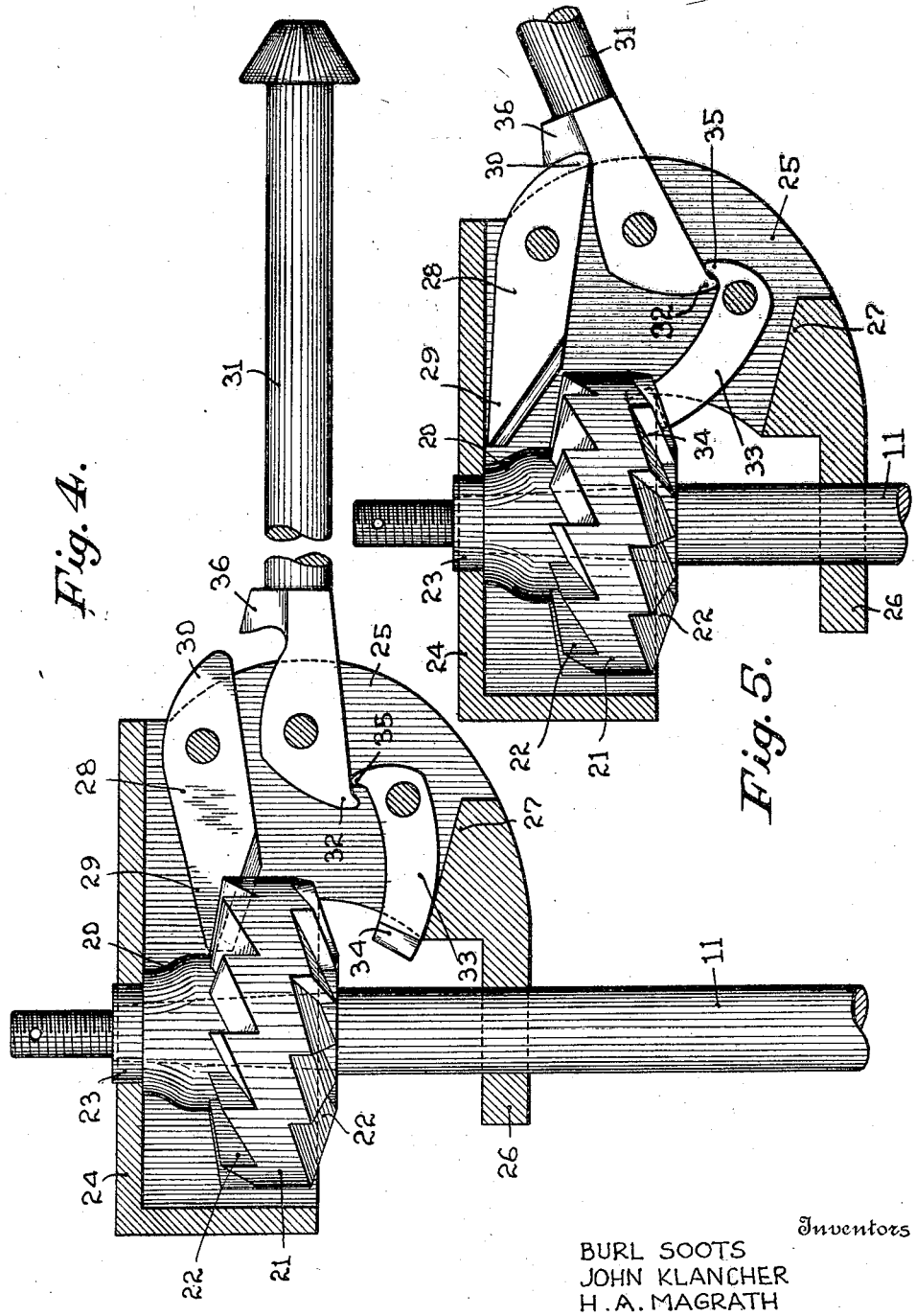

Patented July 29, 1924.

1,503,139

UNITED STATES PATENT OFFICE.

BURL SOOTS, JOHN KLANCHER, HOMER A. MAGRATH, AND GEORGE C. VAN BRIMER, OF PUEBLO, COLORADO.

SAFETY REVERSE RATCHET BRAKE.

Application filed November 22, 1923. Serial No. 676,376.

*To all whom it may concern:*

Be it known that we, BURL SOOTS, JOHN KLANCHER, HOMER A. MAGRATH, and GEORGE C. VAN BRIMER, citizens of the United States, residing at Pueblo, in the county of Pueblo and State of Colorado, have invented certain new and useful Improvements in Safety Reverse Ratchet Brakes, of which the following is a specification.

This invention relates to rail roads and has special reference to a hand brake for freight cars and the like.

This invention has for its objects the provision of a novel and improved means for operating hand brakes wherein the usual ratchet and pawl mechanism operated by the brakeman's foot is eliminated and an improved manually operable device substituted; the provision of an improved ratchet and lever mechanism for intermittently rotating the brake staff; the provision of improved means for rotating the brake staff in a direction to unwind the brake chain, the provision of means of novel character controlled by movement of the brake staff operating lever between certain positions for controlling the direction of rotation of the brake staff, as well as other objects which will be hereinafter more fully apparent.

Reference as to details of construction will now be had to the accompanying drawings wherein;

Figure 1 is a side elevation of a portion of an end of a freight car showing the improved brake operating mechanism applied thereto.

Figures 4 and 5 are fragmentary details illustrating various positions of the operating handle and pawls.

Figure 2:
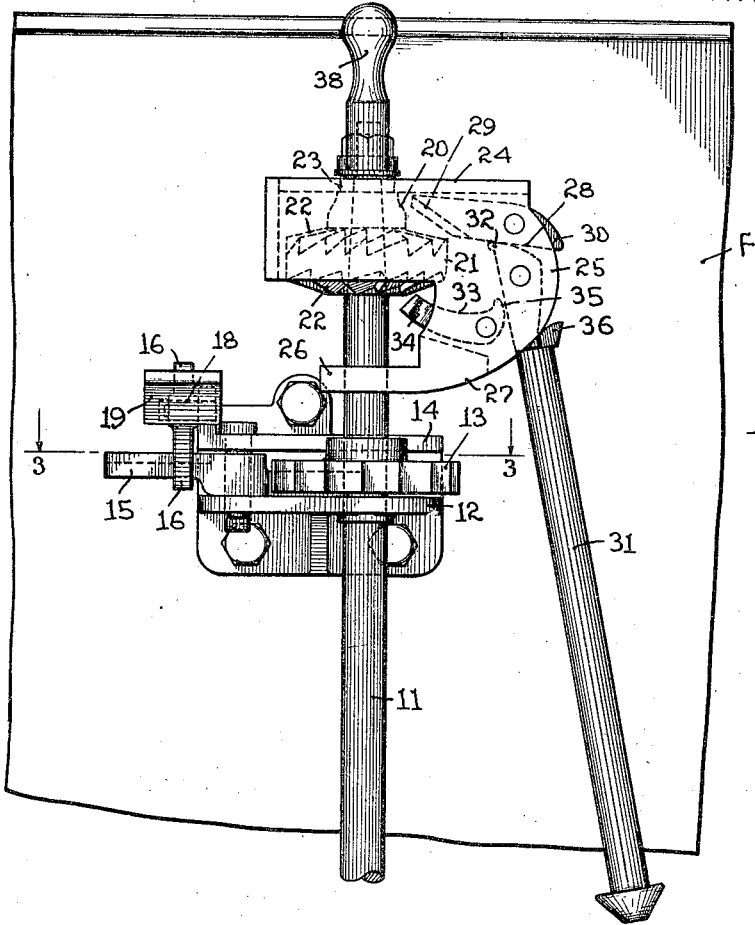
Figure 2 is a similar view of a portion of the freight car end.
Figure 3:
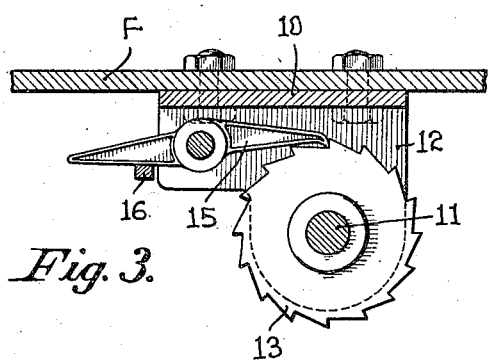
Figure 3 is a section on the line 3—3 of Figure 2.

In the embodiment of the invention here shown there is disclosed a portion of a freight car F. The car here shown is of the ordinary box car type and is provided near its top with a bracket 10 projecting from the end wall of the car to one side of its center so that the brake staff 11 may extend vertically through a projecting flange 12 formed on the bracket without interference by the coupler. This brake staff is connected at its lower end in the usual manner to the brake mechanism of the car but, inasmuch as these parts are all of the usual and well known construction and form no part of the present invention, further reference thereto is omitted nor are the parts illustrated in the drawings.

Just above the flange 12 there is fixed on the staff 11 an edge ratchet 13 and pivoted between the flange 12 and a second flange 14, spaced above said flange 12, is a pawl 15 having one end engageable with the ratchet and its other end projecting laterally into the paths of a pair of angularly disposed arms forming a trip. These arms 16 are connected to form a body portion 17 which is pivotally mounted on a pin 18 projecting from the bracket flange 14 and from the body extends a projection 19, forming a weight to cause said trip to engage the pawl with one or the other of its arms in accordance with the position of the weight to one side or the other of a vertical line drawn through the center of the pivot pin. Thus, when the trip is in the position shown in Figure 1 the pawl 15 will be held in operative engagement with the ratchet and prevent backward or unwinding movement of the brake staff. Similarly, movement of the trip to its opposite position will cause the other arm to engage the tail of the pawl 15 and hold it in inoperative position, free from its ratchet, so that the brake staff can freely turn to release the brake. This trip, being located adjacent the brake head, is thus conveniently positioned for manual operation.

The staff actuating mechanism is carried at the upper end of the staff and comprises a hub 20, fixed on the upper end of the staff and having a peripheral enlargement or flange 21 at its lower end. This flange is provided on both its upper and its lower face with face ratchets 22. At its upper end the hub is provided with a journal 23 whereon is revolubly mounted a bracket 24 having downwardly extending spaced arms 25 forming at their lower ends a bearing 26 revoluble on the staff. One of these arms is provided with a lip 27 projecting inwardly toward the other arm and located adjacent the bearing 26.

The upper ratchet 22 may be termed the brake setting ratchet and pivoted between the arms 25 in position to engage the brake setting ratchet is a pawl 28, the pawl being so pivoted that it has a longer and heavier end 29 extending over the upper ratchet and a shorter tail 30 having a bluntly pointed end. Under these conditions the pawl will be constantly urged into engagement with the upper ratchet by gravity. Also pivoted between the arms 25 is a brake operating lever 31 which normally lies with its handle in depending position as shown in Figure 1. The lever 31 is provided on the pivoted end with a projection or nose 32 which engages beneath the pawl end 29, when the lever handle is depressed, and holds the pawl out of engagement with the upper ratchet 22. If the lever be raised to a horizontal position the nose 32 will move downward so that the pawl end 29 can engage the upper ratchet 22. Under these conditions oscillation of the lever 31 in a horizontal plane will effect intermittent rotation of the staff in brake setting direction and will thus set the brakes.

It sometimes happens that the brake staff, even when freed from all restraint, will fail to rotate in brake releasing direction. To enable such rotation to be manually effected, a second pawl 33 is provided, which has a ratchet engaging end 34, normally lying free from the lower or unwinding ratchet 22 but so pivoted between the arms 25 as to engage such ratchet when raised. To effect such raising into ratchet engaging position this pawl is provided with a short upwardly extending tail 35 lying in the path of the short end of the lever 31 and engaged thereby upon the handle 31 being raised above the horizontal. This pawl normally rests on the lip 27 which restrains its downward movement. Of course it would be impossible to operate the device as a pawl and ratchet mechanism, one ratchet being right handed and the other left, if both pawls were engaged. The upper pawl must therefore be freed from its ratchet upon the lower pawl coming into engagement. To this end the lever 31 is provided with a cam hook 36 which engages the nose 30 of the pawl 28, upon the lever being raised as shown in Figure 5, and slides up that nose lifting the end 29 out of engagement with the upper ratchet 22. This leaves the lower ratchet free to operate and upon oscillating the lever 31 about the staff while holding it raised, the staff will be rotated in brake releasing direction. It is obvious that the trip must be properly set to cooperate with the lever in both setting and releasing the brakes.

In order to provide for convenience and safety in operation the upper end of the staff is equipped with a grab-iron 38 and a step or stand 39 is positioned on the car end at a convenient distance below the lever 31 to enable the brakeman to easily manipulate the device.

While we have here shown one form of the device changes which fall within the scope of the invention will be apparent to engineers and those skilled in the art so that the scope of the invention is not to be restricted by the particular form shown but is to be sufficient to include all forms covered by the appended claims.

Having thus described the invention, what is claimed as new, is:

1. In a mechanism for the purpose specified, a rotatable shaft, a bracket rotatably mounted on said shaft, a lever pivoted to the bracket to swing from a position substantially parallel to the shaft into acute angled relation to the shaft, and a pawl and ratchet mechanism associated with the shaft and bracket and operable under the influence of the varying positions of the lever to effect intermittent rotation of the shaft in one direction or the other.

2. In a mechanism for the purpose described, a rotatable shaft, a bracket rotatably mounted on said shaft, a lever pivoted to the bracket to swing in a plane radial to the shaft, a right and a left hand ratchet fixed on said shaft, and pawls carried by the bracket and normally out of engagement with the ratchets, said pawls being controlled by variation in the position of said lever in its radial movement.

3. In a mechanism for the purpose described, a rotatable shaft, a bracket rotatably mounted on said shaft, a ratchet member fixed on said shaft and having a right and a left hand ratchet, a pair of pawls mounted on the bracket to cooperate with respective ratchets, and an operating lever swingingly mounted on the bracket and normally resting in depending position and holding one of the pawls out of engagement with its ratchet, said lever when raised to a definite position permitting said pawl to move into operative relation with its ratchet, said lever when raised to a second definite position serving to disengage the last mentioned pawl and to move the remaining pawl into operative engagement with the second ratchet.

4. In a mechanism for the purpose described, a rotatable shaft, a bracket rotatably mounted on said shaft, a winding ratchet on said shaft, an unwinding ratchet on said shaft, a bracket embracing said ratchets and mounted for rotation on said shaft, a pawl carried by the brake for cooperation with the winding ratchet and pivoted intermediate its ends to provide a tail, an operating lever pivoted adjacent one of its ends to said bracket, the remaining end of the lever constituting a handle, said lever depending from the bracket in inoperative position and having the short arm at the pivot end engaging said pawl to hold the same free from the winding ratchet, said lever when raised to horizontal position releasing said pawl to permit its cooperating with its ratchet, a cam hook carried by the lever and engageable with the tail of the pawl upon the lever being raised above horizontal position to free the pawl from its ratchet, and a second pawl normally out of engagement with the unwinding ratchet, said second pawl lying in the path of the lever and engaged thereby upon the lever being raised above the horizontal.

5. In a mechanism for the purpose described, a rotatable shaft, a bracket rotatably mounted on said shaft, a ratchet member fixed on said shaft and having a right and a left hand ratchet, a pair of pawls mounted on the bracket to cooperate with respective ratchets, an operating lever swingingly mounted on the bracket and normally resting in depending position and holding one of the pawls out of engagement with its ratchet, said lever when raised to a definite position permitting said pawl to move into operative relation with its ratchet, said lever when raised to a second definite position serving to disengage the last mentioned pawl and to move the remaining pawl into operative engagement with the second ratchet, a third ratchet carried by the shaft, and a third pawl pivoted at a fixed point adjacent the shaft and cooperating with the third ratchet to restrain the shaft from movement in one direction, said third pawl being movable to free the shaft.

6. In a mechanism for the purpose described, a rotatable shaft, a bracket rotatably mounted on said shaft, a winding ratchet on said shaft, an unwinding ratchet on said shaft, a bracket embracing said ratchets and mounted for rotation on said shaft, a pawl carried by the brake for cooperation with the winding ratchet and pivoted intermediate its ends to provide a tail, an operating lever pivoted adjacent one of its ends to said bracket, the remaining end of the lever constituting a handle, said lever depending from the bracket in inoperative position and having the short arm at the pivot end engaging said pawl to hold the same free from the winding ratchet, said lever when raised to horizontal releasing said pawl to permit its cooperating with its ratchet, a cam hook carried by the lever and engageable with the tail of the pawl upon the lever being raised above horizontal position to free the pawl from its ratchet, a second pawl normally out of engagement with the unwinding ratchet, said second pawl lying in the path of the lever and engaged thereby upon the lever being raised above the horizontal, a third ratchet carried by the shaft, and a third pawl pivoted at a fixed point adjacent the shaft and cooperating with the third ratchet to restrain the shaft from movement in one direction, said third pawl being movable to free the shaft.

In testimony whereof we affix our signatures.

BURL SOOTS.
JOHN KLANCHER.
HOMER A. MAGRATH.
GEORGE C. VAN BRIMER.